US012811907B2

(12) United States Patent
Henry et al.

(10) Patent No.: US 12,811,907 B2
(45) Date of Patent: Nov. 24, 2026

(54) EPOCH SCHEME FOR STATION PRIVACY

(71) Applicant: Cisco Technology, Inc., San Jose, CA (US)

(72) Inventors: Jerome Henry, Pittsboro, NC (US); Domenico Ficara, Essertines-sur-Yverdon (CH); Ugo M. Campiglio, Morges (CH); Javier Contreras, Barcelona (ES); Juan Carlos Zuniga, Montreal (CA); Stephen M. Orr, Wallkill, NY (US)

(73) Assignee: Cisco Technology, Inc., San Jose, CA (US)

( * ) Notice: Subject to any disclaimer, the term of this patent is extended or adjusted under 35 U.S.C. 154(b) by 58 days.

(21) Appl. No.: 18/893,074

(22) Filed: Sep. 23, 2024

(65) Prior Publication Data

US 2025/0106182 A1 Mar. 27, 2025

Related U.S. Application Data

(60) Provisional application No. 63/633,024, filed on Apr. 11, 2024, provisional application No. 63/564,811, filed on Mar. 13, 2024, provisional application No. 63/584,867, filed on Sep. 23, 2023.

(51) Int. Cl.
*H04L 61/5053* (2022.01)

(52) U.S. Cl.
CPC ................................ *H04L 61/5053* (2022.05)

(58) Field of Classification Search
CPC ............ H04L 61/5053; H04L 61/5038; H04L 61/103; H04L 2101/622; H04W 12/61; H04W 12/02; H04W 84/12
USPC .......................................................... 709/245
See application file for complete search history.

(56) References Cited

U.S. PATENT DOCUMENTS

| | | | |
|---|---|---|---|
| 2016/0135041 A1 | 5/2016 | Lee et al. | |
| 2016/0234134 A1* | 8/2016 | Curtis | H04L 49/3009 |
| 2016/0302058 A1 | 10/2016 | Mestanov et al. | |
| 2019/0334806 A1 | 10/2019 | Sugatoor et al. | |

(Continued)

FOREIGN PATENT DOCUMENTS

| | | | |
|---|---|---|---|
| EP | 3945739 A1 | 2/2022 | |
| EP | 4489475 A1 | 1/2025 | |
| WO | WO-2023164949 A1 * | 9/2023 | H04W 12/02 |

OTHER PUBLICATIONS

International Search Report and Written Opinion for International Application No. PCT/US2024/047973, mailed Nov. 11, 2024, 16 Pages.

(Continued)

*Primary Examiner* — Meng Vang
(74) *Attorney, Agent, or Firm* — Merchant & Gould P.C.

(57) ABSTRACT

An epoch scheme for Station (STA) privacy and, specifically, a structured Media Access Control (MAC) address rotation schedule for STAs may be provided. Providing an epoch scheme for STA privacy can include determining epoch parameters for a STA, the epoch parameters comprising a minimum epoch period duration and a maximum epoch period duration. The epoch parameters are sent to the STA, wherein the STA is operable to rotate a MAC address each epoch period at a time between the minimum epoch period duration and the maximum epoch period duration. A mapping of the STA and the MAC address can be updated each epoch period.

20 Claims, 8 Drawing Sheets

(56) References Cited

U.S. PATENT DOCUMENTS

| | | | | |
|---|---|---|---|---|
| 2021/0360465 | A1* | 11/2021 | Henry | H02M 1/0029 |
| 2022/0361269 | A1 | 11/2022 | Ficara et al. | |
| 2022/0377042 | A1 | 11/2022 | Henry et al. | |
| 2022/0386109 | A1* | 12/2022 | Mccann | H04L 61/5038 |
| 2023/0300131 | A1* | 9/2023 | Fang | H04W 12/02 713/170 |
| 2023/0319943 | A1 | 10/2023 | Barton et al. | |
| 2024/0007846 | A1* | 1/2024 | Kneckt | H04W 8/26 |

OTHER PUBLICATIONS

"MAC Address Randomization—A Primer on the Development, Current Scenario and Future Implications", Indio Networks, Dec. 31, 2021, 5 Pages, XP093217312, Retrieved from https://www.indionetworks.com/documents/whitepapers/MAC-Randomization-White-Paper.pdf on Oct. 23, 2024, p. 3, Table, Coluimn "cyclically randomize".

Baron (Canon) S., et al., "EDP Epoch Operation Normative Text for 11bi", IEEE Draft 11-24-0079-02-00BI-EDP-EPOCH-OPERATION-NORMATIVE-TEXT-FOR-11BI, IEEE-SA Mentor, Piscataway NJ USA, vol. 802.11bi, No. 2, Jan. 18, 2024, 4 Pages, XP068275279, Retrieved from https//mentor.ieee.org/802.11/dcn/24/11-24-0079-02-00bi-edp-epoch-operation-normative-text-for-11bi.docx on 2 Jan. 18, 2024, p. 1, p. 4.

Huang P-K., "TGbi D0.4 final.zip.pdf", IEEE Draft WGDS, IEEE P802.11bi/D0.4, 1544955918266, IEEE-SAIMEET Central, Piscataway, NJ USA, vol. 802.11—Editorial, May 27, 2024, p. 1, XP068304970, pp. 1-92, Retrieved from https//ieee-sa.imeetcentral.com/p/aQAAAAAFHQwG on May 27, 2024, 10.71.2 EDP epoch Operation.

International Search Report and Written Opinion for International Application No. PCT/US2025/011275, mailed Mar. 19, 2025, 18 Pages.

Baron S., et al., "EDP Epoch Operation Normative Text for 11bi", IEEE 802.11-24/0645r0, Apr. 3, 2024, 8 Pages.

Baron S., et al., "Enhanced Randomized and Changing MAC Address (ERCM)", IEEE 802.11-22/0114r0-3, Jan. 18, 2022, 56 Pages.

Baron S., et al., "RCM Follow up", IEEE 802.11-23/1148r0-1, Jul. 6, 2023, 22 Pages.

De La Oliva A., et al., "Proposal for Sliding Window MAC Address Rotation", IEEE 802.11-23/1246r0-2, Jul. 11, 2023, 15 Pages.

Ficara D., et al., "Periodic Frame Anonymization", IEEE 802.11-24/0604r0-11, Mar. 13, 2024, 136 Pages.

Ficara D., et al., "TGbi—Proposal for Coordinated MAC Rotation", IEEE 802.11-23/1984r0-3, Nov. 8, 2023, 44 Pages.

Hawkes P., et al., "Client Frame Tracking Countermeasures (CFTC)", IEEE 802.11-23/0873r0-2, May 16, 2023, 49 Pages.

Hawkes P., et al., "Frame Anonymization (FA) and EDP Epoch operation", IEEE 802.11-24/0222r0-2, Jan. 30, 2024, 19 Pages.

Henry J., et al., "Auto and Group Epochs", IEEE 802.11-24/0681r0-1, Apr. 9, 2024, 25 Pages.

Henry J., et al., "Epoch Structure Proposal", IEEE 802.11-23/1675r0-1, Sep. 26, 2023, 31 Pages.

Kneckt J., et al., "Periodic Obfuscation", IEEE 802.11-24/0579r0, Mar. 11, 2024, 12 Pages.

Stacey R., et al., "IEEE P802.11bi™/D0.5—Draft Standard for Information technology—Part 11: Wireless LAN Medium Access Control(MAC) and Physical Layer (PHY) Specifications—Amendment 5: Enhanced Service with Data Privacy Protection", IEEE P802.11bi™/D0.5r0, Jul. 1, 2024, pp. 1-94.

Stanley D. V., et al., "IEEE P802.11bi™/D0.3 Draft Standard for Information technology—Part 11: Wireless LAN Medium Access Control (MAC) and Physical Layer (PHY) Specifications—Amendment 5: Enhanced Service with Data Privacy Protection", IEEE P802.11bi™/D0.3r0, Mar. 1, 2024, pp. 1-68.

Wagner I., et al., "Technical Privacy Metrics: A Systematic Survey", ACM Computing Surveys, vol. 51, No. 3, Article 57, Jun. 2018, pp. 1-45.

* cited by examiner

EPOCH SCHEME FOR STATION PRIVACY

RELATED APPLICATION

Under provisions of 35 U.S.C. § 119 (e), Applicant claims the benefit of and priority to U.S. Provisional Application No. 63/584,867, filed Sep. 23, 2023, U.S. Provisional Application No. 63/564,811, filed Mar. 13, 2024, and U.S. Provisional Application No. 63/633,024, filed Apr. 11, 2024, the disclosures of which are incorporated herein by reference in their entirety.

TECHNICAL FIELD

The present disclosure relates generally to providing an epoch scheme for Station (STA) privacy and specifically to providing a structured Media Access Control (MAC) address rotation schedule for STAs.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
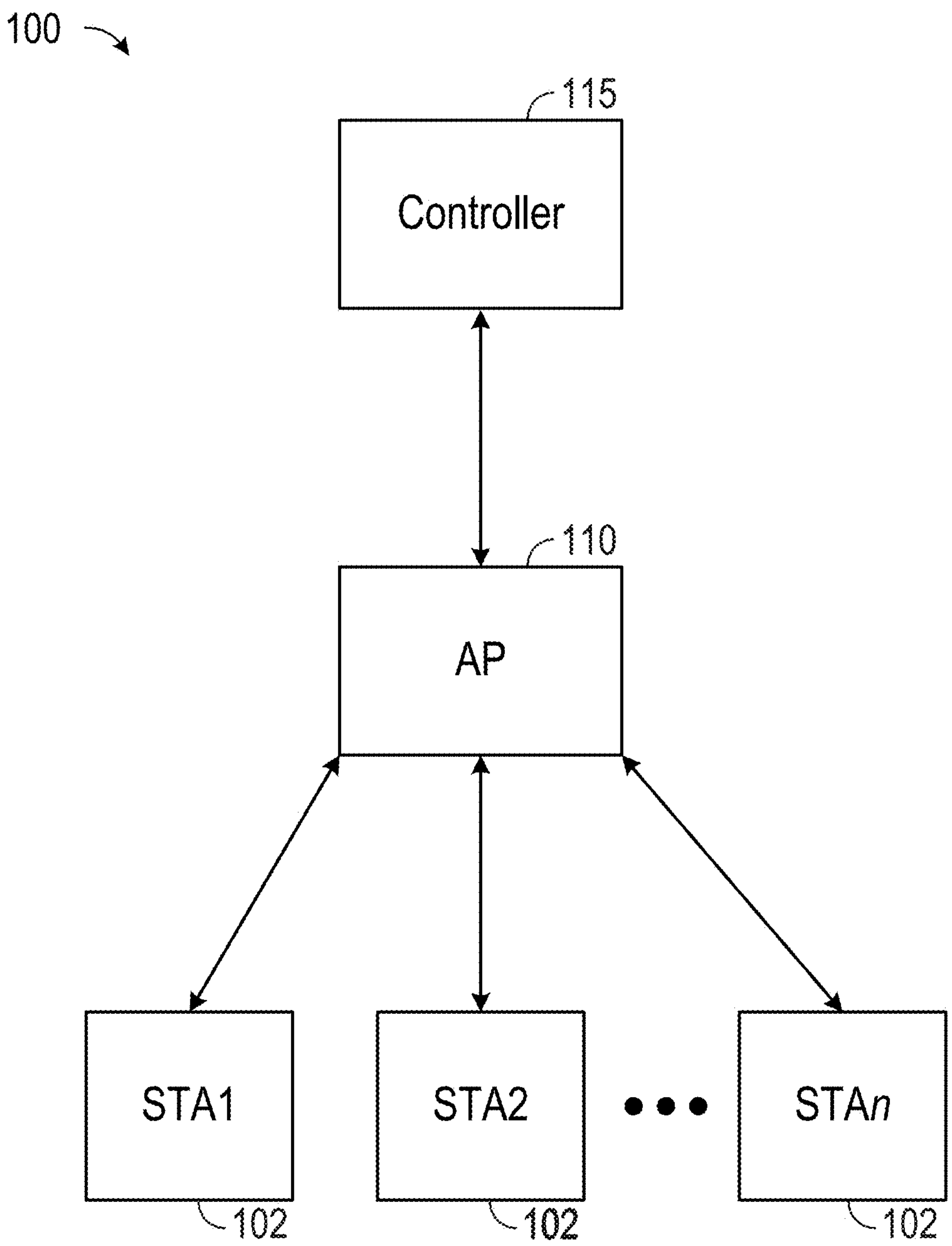
FIG. 1 is a block diagram of an operating environment for an epoch scheme for Station (STA) privacy in accordance with aspects of the present disclosure.

An epoch scheme for Station (STA) privacy and, specifically, a structured Media Access Control (MAC) address rotation schedule for STAs may be provided. Providing an epoch scheme for STA privacy can include determining epoch parameters for a STA, the epoch parameters comprising a minimum epoch period duration and a maximum epoch period duration. The epoch parameters are sent to the STA, wherein the STA is operable to rotate a MAC address each epoch period at a time between the minimum epoch period duration and the maximum epoch period duration. A mapping of the STA and the MAC address can be updated each epoch period.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In a wireless network, such as networks operating according to the Institute of Electrical and Electronics Engineers (IEEE) 802.11 standard, the Media Access Control (MAC) addresses of Stations (STAs) associated to an Access Point (AP) are visible to observers. Observers can use the visible MAC addresses to track the activity of clients connected to the wireless network. To enhance network security and prevent client tracking by observers using MAC addresses, STAs can utilize Randomized and Changing MAC (RCM) address techniques. For example, IEEE 802.11bi allows for the MAC addresses in the header of frames to be randomized or otherwise replaced with artificial MAC addresses to obfuscate the real MAC address of a STA, thereby enabling STAs to change MAC addresses while associated to an AP.

While changing MAC addresses can increase privacy, changing MAC addresses can also lead to connectivity issues and disruption. For example, a STA may connect to a service that uses static MAC addresses as identifiers, leading to a STA having to repeatedly reauthenticate or log-in when the MAC address is changed. In other instances, the STA may be required to reauthenticate or log-in when the STA idles, disconnects, and reconnects to a service with a different MAC address. Further issues can arise for screen time and content limits such as parental controls because the limits are often enforced by using the static MAC address for a STA. If the MAC address changes, the limits may not be able to be implemented on the STA. Network operators can also experience challenges because continually changing device identifiers can make it difficult for the network operators to identify an STA, determine if he STA is legitimate, determine how many STAs are connected to the network, and/or the like.

To address the potential connectivity issues and disruptions associated with STAs changing MAC addresses, APs need to determine or otherwise accept the new MAC address the STA rotates to and map the new MAC address back to the STA. To maintain an accurate mapping of STAs to MAC addresses, the AP requires the associated STAs to change MAC addresses at a slow enough pace for the AP. A structured MAC address rotation may enable STAs to change MAC addresses to maintain privacy at a pace that enables the AP to accurately maintain a mapping of STAs to MAC addresses. The structured MAC address rotation can include an AP announcing epoch periods where each STA is able to or instructed to change its Over-the-Air (OTA) MAC address and/or Association ID (AID) according to a scheme agreed upon by the AP and the STA when the STA associates with the AP. The agreed upon scheme can enable the AP and the respective STA to determine in advance the values of the STA OTA MAC and/or AID for any future epoch period. The epoch periods can be individually implemented for each individual STA, so the STAs can switch MAC addresses according to the respective epoch periods instead of each STA switching simultaneously.

FIG. 1 is a block diagram of an operating environment 100 for an epoch scheme for STA privacy. The operating environment 100 can include STAs 102 (e.g., STA1, STA2, STAn), an AP 110, and a controller 115. Each STA 102 can be any device that connects to a network, such as a smart phone, a tablet, a personal computer, an Internet-of-Things device, a personal computer, and/or the like. The AP 110 can enable devices such as the STAs 102 to wirelessly connect to the network. The controller 115 can be any network controller (e.g., a Wireless Local Area Network controller), and the controller 115 can manage the AP 110, other APs, and/or other devices connected to the network.

Initiating Epoch Periods for MAC Address Rotation

The AP 110 can advertise support for epoch periods for MAC address rotation for enhanced privacy, such as in beacons the AP 110 to advertise its availability for association, the network, etc., probe responses during association and/or the like. The AP 110 can use an enhanced privacy element for advertising support for epoch periods for MAC address rotation, and the enhanced privacy element will be described in more detail herein with respect to FIG. 2. The STA 102 can indicate that it is able to use and/or wants to use epoch periods for MAC address rotation during association, such as in a probe request. In other embodiments, the AP 110 may propose using epoch periods for MAC address rotation to the STA 102 before determining the STA 102 can and wants to use epoch periods for MAC address rotation. In some embodiments, the AP 110 can propose or otherwise send epoch parameters to an STA 102 once the STA 102 associates with the AP 110. The AP 110 can send the epoch parameters to the STA 102 at the end of the four-way handshake of the association process (e.g., after the AP 110 and the STA 102 have exchanged identifiers) for example.

The AP 110 can advertise support for both a group epoch period structure and an individual STA epoch period structure. For the group epoch period structure, the AP 110 can define one or more groups that STAs 102 can join. For the individual STA epoch structure, the AP 110 can provide individual epoch parameters for an STA 102. Each group may have epoch parameters that each STA in the group will use for rotating MAC addresses. Thus, the STAs 102 in a same group may rotate MAC addresses in the same way. The AP 110 can advertise available groups with an available groups advertisement element, as will be described in further detail herein with respect to FIG. 3.

Different STAs 102 can indicate support for group epoch periods for MAC address rotation only and/or individual STA epoch periods for MAC address rotation. The AP 110 can then assign STAs 102 to a group or assign individual epoch parameters to an STA 102, for example based on what the respective STA 102 supports and/or requests. In some embodiments, each STA 102 is assigned to a group by default if the STA 102 supports epoch periods for MAC address rotation, and the STA 102 can determine to stay in the assigned group, determine to join another group, request individual epoch parameters, or request not to use epoch periods for MAC address rotation. An STA 102 can request an assignment to a specific group or request individual STA epoch periods using an individual STA epoch setting element, as will be described in further detail herein with respect to FIG. 4. In further embodiments, the AP 110 can assign each STA 102 individual epoch parameters by default.

For the group epoch structure, the AP 110 can determine epoch parameters for one or more groups. For the individual STA epoch structure, the AP 110 can determine epoch parameters for STAs 102 to rotate MAC addresses for enhanced privacy. Epoch parameters for STAs 102 to rotate MAC addresses can include a proposed minimum epoch period duration (e.g., ten seconds) and a proposed maximum epoch period duration (e.g., twenty minutes). The parameters can also include a transmission timeout value (e.g., two seconds), a starting side value (e.g., a Boolean value), the structure of the MAC address rotation, and/or the like. The AP 110 may determine individual epoch parameters based on the capabilities and/or configuration of the AP 110, the capabilities and/or configuration of the respective STA 102, the environment, and/or the like. For example, the AP 110 may provide a minimum epoch duration that the AP 110 can support without losing track of the MAC address the respective STA 102 is using.

When considering environmental factors, a public venue may present more exposure for STA privacy than a private venue. Thus, the AP 110 may determine a maximum duration based on the environment being classified public or private, the number of clients in the environment, an exposure risk to the STA privacy (e.g., as set by a network entity), and/or the like. For example, the maximum epoch duration may be longer in a private venue than a public venue because the AP 110 considers a private venue to be a lower security risk.

The AP 110 can determine epoch parameters for one or more groups based on the capabilities and/or configuration of the AP 110, estimated or otherwise determined capabilities and/or configurations of STAs 102, the environment, and/or the like. For example, the AP 110 can create a group with stricter security standards and a group with more relaxed security standards, so STAs 102 can select or be assigned a group based on the level of security each respective STA wishes to maintain.

In some embodiments, the AP 110 and an STA 102 can determine the structure of the MAC address rotation when the epoch duration parameters are shared or separately from determining the epoch duration parameters. The AP 110 may instruct the STA 102 how to determine what the MAC address will be for future epoch periods, such as using MAC address randomization techniques. In other embodiments, the STA 102 determines how to rotate MAC addresses without input from the AP 110.

In certain embodiments, the AP 110 sends a protected action frame to the STA 102 to propose or otherwise send the epoch parameters. The protected action frame may include a proposed epoch minimum duration and a proposed epoch maximum duration. The proposal may also include a previous MAC address timeout value, a starting side Boolean value, and/or the like in example implementations.

The AP 110 and the STA 102 can establish the epoch parameters using an augmented Target Wake Time (TWT) exchange in some embodiments. The AP 110 and the STA 102 can use the augmented TWT exchange to negotiate a target next epoch period start time and/or other epoch parameters. For example, the AP 110 can propose or otherwise send epoch parameters to the STA 102, the STA 102 can negotiate the epoch parameters, etc. during the TWT exchange.

Using Epoch Periods for MAC Address Rotation

Once an STA 102 receives the epoch parameters with the minimum epoch period duration and the maximum epoch period duration, the STA 102 can rotate its MAC address at a random time within the boundaries of the minimum epoch duration and the maximum epoch duration. The STA 102 can request changes to the proposed parameters or ignore one or more of the proposed parameters in some instances. For example, the STA 102 may have a more relaxed security requirement and determine that the maximum epoch duration can be extended past the proposed maximum epoch duration. In another example, the STA 102 can determine to use epoch periods that are shorter than a proposed minimum duration. However, when the STA 102 ignores the proposed minimum duration, the STA 102 may perform MAC address rotation faster than the AP 110 may be capable of or is configured to sustain. The AP 110 may then lose track of the MAC address the STA 102 is using, resulting in the STA 102 having to restart its session. Thus, the STAs 102 may attempt to follow proposed epoch parameters as often as possible to ensure proper operation when rotating the MAC address.

In some embodiments, the AP 110 does not propose epoch parameters for an STA 102 and instead sends a trigger signal to the STA 102 each epoch period to instruct the STA 102 when to rotate the MAC address. Thus, the AP 110 and/or the controller 115 may control the epoch periods for an STA 102 without the STA 102 needing to be aware of the epoch periods. The AP 110 can establish with the STA 102 that the AP 110 will send trigger signals to an STA 102 for rotating the MAC address by setting a bit or field in the frame the AP 110 uses to propose using epoch periods for MAC address rotation in example implementations. The STA 102 can send a response indicating whether it accepts the proposal to use trigger signals for rotating the MAC address.

In some instances, the STA 102 may change the MAC address without following the epoch parameters or according to trigger signals. For example, the STA 102 may change the MAC address any time the STA 102 roams to a new AP. The STA 102 can also determine to change the MAC address after a certain number of frames are exchanged. Further, some STAs 102 may have stricter privacy requirements or may otherwise be more sensitive to privacy exposure, and the STA 102 may or may not honor the minimum epoch duration and/or maximum epoch duration values one or more time based on the circumstances of the STA 102. The AP 110 may still track the MAC address changes when possible, to maintain an accurate mapping of STAs 102 to MAC addresses.

Transmission Timeout

An epoch period ends and a new epoch period begins when an STA 102 rotates its MAC address. Thus, the STA 102 starts using a new MAC address for the duration of the new epoch period that is different from the previous MAC address used in the previous epoch. However, the AP 110, the STA 102, and/or other devices may store or otherwise know the previous MAC address of the STA 102 for completing queued or otherwise in progress transmissions. For example, the STA 102 can transit any frame (e.g., MAC Protocol Data Unit (MPDU)) with the previous MAC address that the STA 102 already sent to its stack for transmission before rotating the MAC address (e.g., including retries, etc.) until the STA 102 reaches a transmission timeout. Similarly, the AP 110 can transmit any frame with the previous MAC address as the target (e.g., that the AP 110 sent to its stack for transmission to the STA 102) until the AP 110 reaches a transmission timeout. The AP 110 may empty its stack of frames with the previous MAC address as the target when the AP 110 reaches the transmission timeout.

The AP 110 can determine or otherwise set a transmission timeout for using MAC addresses. For example, the transmission timeout can be included in the proposed epoch parameters the AP 110 sends as described above. The transmission timeout indicates a time when the AP 110 will remove a previous MAC address from its memory. Devices such as an STA 102 will also remove the previous MAC address from its memory at the time of the transmission timeout because the previous MAC address will no longer be able to be used.

Until the time defined by the transmission timeout is reached, the AP 110 can accept frames received both from the previous MAC address and the current MAC address as originating from the STA 102 and send frames to the STA 102 using the previous MAC address and the current MAC address as the target address. Similarly, the STA 102 can accept frames with the target address being the previous MAC address or the current MAC address and send frames to the AP 110 using the previous MAC address and the current MAC address. After the time indicated by the transmission timeout, the AP 110 may reject transmissions to and from the STA 102 as invalid if the transmissions use the previous MAC address. In some embodiments, the STA 102 can use the transmission timeout to determine when to stop attempting to send frames if they are still in the STA buffer, such as if the queued frames will not be transmitted by the time indicated by the transmission timeout. Similarly, the AP 110 can remove queued frames targeted to the previous MAC address if queued frames will not be transmitted by the transmission timeout.

Initiating the Next Epoch Period

In certain embodiments, the next epoch is always started by an STA 102 rotating to a new MAC address. The AP 110 can determine the STA 102 rotated MAC addresses and a new epoch period has started when the AP 110 receives a first valid frame sent from the new, current MAC address. In other embodiments, either the AP 110 or the STA 102 can start the next epoch. The first device to start the next epoch may indicate to the other device that the next epoch has started when using the new MAC address by sending a frame using the next MAC address. In some example implementations, the AP 110 can generate a starting side value (e.g., a random Boolean value), that indicates which device should start the next epoch period (e.g., a value of zero indicates the STA 102 should start the next epoch period, a value of one indicates the AP 110 should start the next epoch period). The AP 110 can communicate the starting side value when sending the epoch parameters.

At the start of a next epoch, the AP 110 can send a frame to the current MAC address that the AP 110 would send to an unassociated STA (e.g. a probe response). The STA 102 can respond to the frame to the MAC address for an unassociated STA with frames that are expected for a non-associated STA (e.g. authentication frame). For example, when a STA 102 starts the next epoch period, the STA 102 may send to the AP 110 one or more management frames that are typically expected when a STA associates (e.g. probe requests, authentication frames, association frame) to further enhance privacy. The management frames may contain no real information, such as randomized information. The STA 102 can send the one or more management frames to appear to be a new STA undergoing association so observers may believe the next MAC address is associated with a new device instead of a changing MAC address for the STA. The AP 110 can respond to the management frames with any responses typically expected when a STA associates. Thus, the AP 110 and the STA 102 may perform a replica association process to make it appear that the STA 102 is a new device associating to the AP 110 when rotating MAC addresses.

Multiple MAC Addresses

In some embodiments, an STA 102 may use more than one MAC address during each epoch. For example, the STA 102 can actively use a first MAC address for transmit and receive operations and rotate a second MAC address. Once the second MAC address has reached a full connectivity state with the AP 110 and/or all transmissions associated with the first MAC address complete, the STA 102 can start using the second MAC address for transmit and receive operations and rotate the first MAC address. The STA 102 can continue to switch off which MAC address is rotated. The STA 102 can also send real or fictitious management frames as described above to emulate a new STA associating to the AP 110.

Collision Avoidance

In certain embodiments, the AP 110 and the STAs 102 determine in advance the future MAC addresses for future epochs. The AP 110 and the STAs 102 can also determine the Association Identifier (AID) for future epochs. The AP 110 can then determine when two STAs 102 are likely to use MAC addresses and/or AIDs in future epochs simultaneously that may result in a collision. When the AP 110 determines a collision may occur, the AP 110 may send a collision warning action frame to one or more of the STAs 102 that may be involved in the collision before the associated future epoch period occurs. The collision warning action frame may instruct the receiving STA 102 to skip the parameters of the associated future epoch period (e.g., the MAC address, the AID) and use the parameters of the subsequent future epoch period. An STA 102 can respond to the collision warning action frame to indicate whether the STA 102 will move to the subsequent future epoch to avoid the collision or will ignore the request and move to the associated future epoch. The collision warning action frame is described in more detail herein with respect to FIG. 5.

The controller 115 and/or other network device may perform one or more of the operations of the AP 110 described above and/or support the AP 110 in some embodiments. For example, the controller 115 can determine epoch parameters, initiate the transmission of trigger signals, and/or the like. In some embodiments, when an STA 102 moves to another AP in the network, the controller 115 can manage transferring the established epoch parameters of the STA 102 to the other AP, including keeping the same parameters or updating the parameters based on the new AP. Thus, STAs 102 can maintain the MAC address rotation when roaming to other APs. In other embodiments, the STAs 102 may be required to reestablish epoch parameters when roaming to a new AP.

The elements described above of the operating environment 100 (e.g., the STAs 102, the AP 110, the controller 115, etc.) may be practiced in hardware, in software (including firmware, resident software, micro-code, etc.), in a combination of hardware and software, or in any other circuits or systems. The elements of the operating environment 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of the operating environment 100 may also be practiced using other technologies capable of performing logical operations such as, for example, AND, OR, and NOT, including but not limited to, mechanical, optical, fluidic, and quantum technologies. As described in greater detail below with respect to FIGS. 7 and 8, the elements of the operating environment 100 may be practiced in a computing device 700 and/or communications device 800.

Frames

Figure 2:
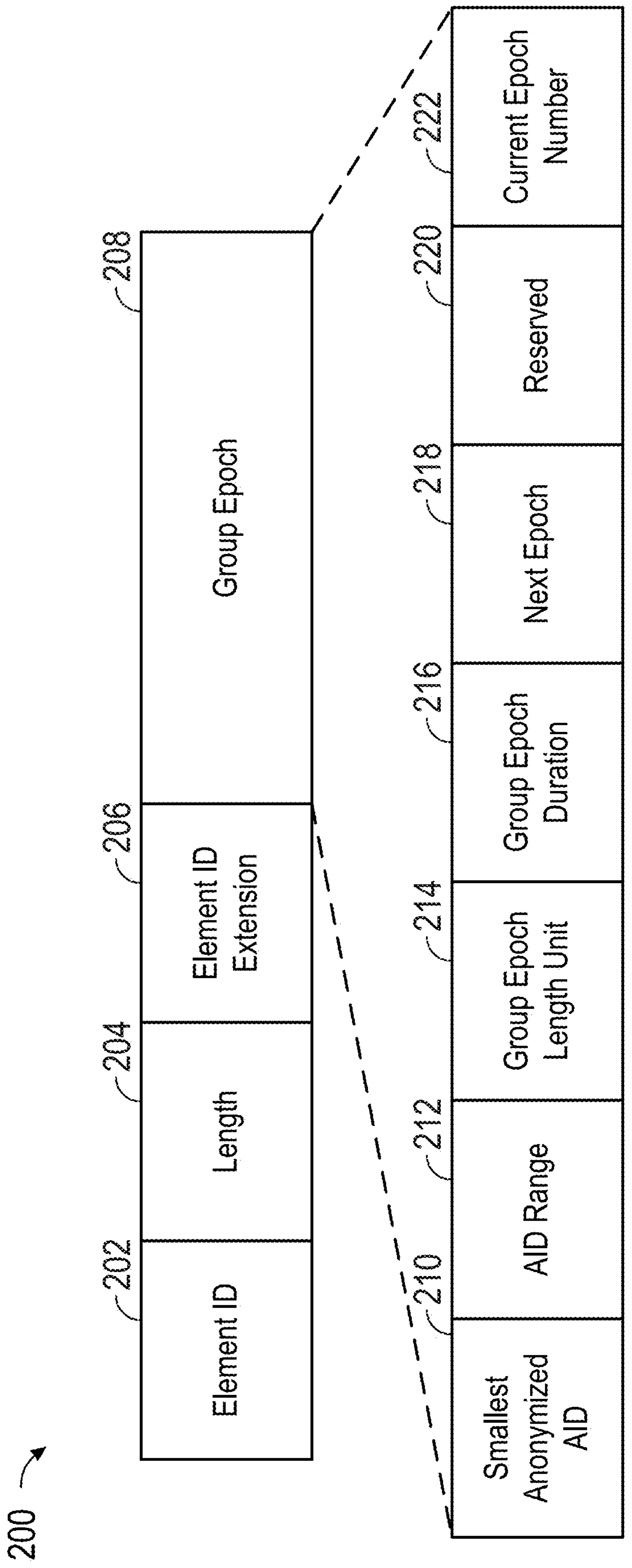
FIG. 2 is a block diagram of an enhanced privacy element in accordance with aspects of the present disclosure.

FIG. 2 is a block diagram of an enhanced privacy element 200 in accordance with aspects of the present disclosure. The AP 110 can advertise the enhanced privacy element 200 to the STAs 102 for the STAs 102 to start using epoch periods for MAC address rotation. In certain embodiments, the AP 110 advertises a group for the STAs 102 to join initially using the enhanced privacy element 200. The enhanced privacy element 200 may be an Information Element (IE) that is part of frames, such as frames the AP 110 sends for association (e.g., beacons for advertising the AP 110 and the network, probe responses during association, etc.).

The enhanced privacy element 200 includes an element ID field 202, a length field 204, an element ID extension field 206, and a group epoch field 208. The element ID field 202 identifies the type of the enhanced privacy element 200. The element ID extension field 206 may be used with the element ID field 202 to identify the type of the enhanced privacy element 200. The element ID extension field 206 may not be present if the element ID field 202 can identify the type alone. The length field 204 indicates the length of the enhanced privacy element 200. In certain embodiments, the element ID field 202, the length field 204, and the element ID extension field 206 are all one octet in length and the group epoch field 208 is between zero and twelve octets in length, and the length field 204 indicates the total number of octets.

The group epoch field 208 can include information about a group for the receiving STA 102 to join for MAC address rotation. The group epoch field 208 can include a smallest anonymized AID field 210, an AID range field 212, a group epoch length unit field 214, a group epoch duration field 216, a next epoch field 218, a reserved field 220, and a current epoch number field 222. The smallest anonymized AID field 210 can indicate the smallest anonymized AID an STA 102 can use when rotating its MAC address. The AID range field 212 can indicate the range of values the STA 102 can use for an AID when rotating its MAC address. The group epoch length unit field 214 and/or the group epoch duration field 216 can indicate a group epoch period length, the minimum epoch period duration, the maximum epoch period duration, and/or the like. The group epoch period length may be a length of each epoch period for an epoch group. In some embodiments, only one of the group epoch length unit field 214 or the group epoch duration field 216 is present for indicating the group epoch period length, the minimum epoch period duration, the maximum epoch period duration, etc., such as when the AP 110 is assigning individual epoch parameters.

The next epoch field 218 can indicate the next epoch period for the STA 102 to begin operating according to group requirements for MAC address rotation. The reserved field 220 can be and reserved for optional and/or future functions. The current epoch number field 222 can indicate the current epoch period the group is currently at for the STA 102 to determine when to begin operating according to group requirements for MAC address rotation.

In some embodiments, the group epoch field 208 can include information for multiple groups, enabling STAs 102 to request to join a selected group. In further embodiments, the group epoch field 208 can include information for no groups (e.g., the group epoch field 208 being zero octets in length) and thus indicate that the STAs 102 must request individual epoch periods for MAC address rotation. Thus, the enhanced privacy element 200 can detail zero or more groups for STAs 102 to join for MAC address rotation.

Figure 3:
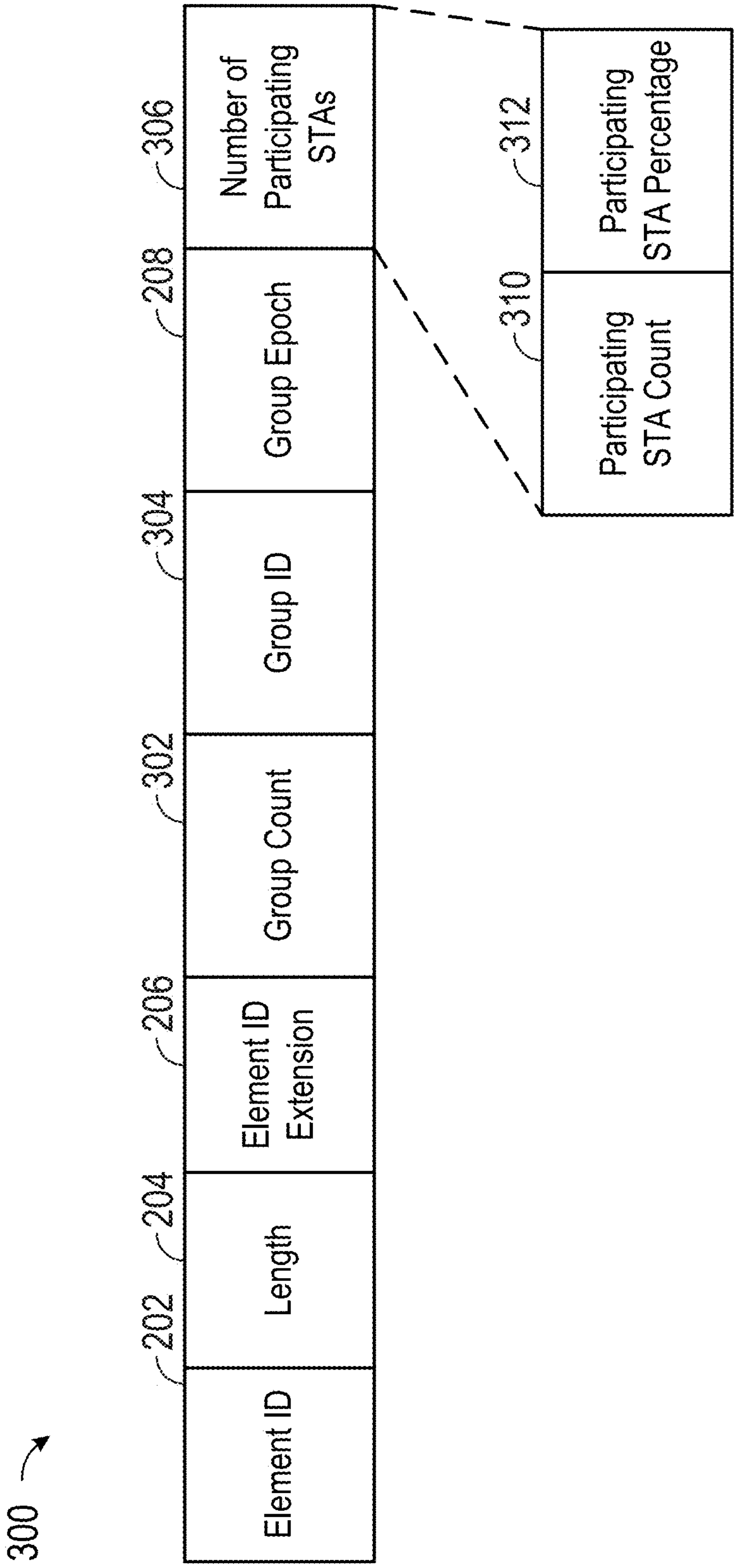
FIG. 3 is a block diagram of an available groups advertisement element in accordance with aspects of the present disclosure.

FIG. 3 is a block diagram of an available groups advertisement element 300 in accordance with aspects of the present disclosure. The AP 110 can advertise the available epoch groups to the STAs 102 for the STAs 102 to select a group to join for MAC address rotation. In certain embodiments, the AP 110 advertises the available groups for the STAs 102 to join at the same time or shortly after the AP 110 advertises the enhanced privacy element 200 to the STAs 102. For example, the AP 110 can advertise or otherwise send an available groups advertisement element 300 for each available group to a STA 102 after the four-way handshake is completed with the STA 102. The AP 110 can also periodically advertise the available groups using the available groups advertisement element 300 so the STAs 102 have accurate information of the available groups. The available groups advertisement element 300 may be an IE that is part of frames the AP 110 sends.

The available groups advertisement element 300 includes the element ID field 202, the length field 204, the element ID extension field 206, a group count field 302, a group ID field 304, the group epoch field 208, and a number of participating STAs field 306. The element ID field 202 identifies the type of the available groups advertisement element 300. The element ID extension field 206 may be used with the element ID field 202 to identify the type of the available groups advertisement element 300, but the element ID extension field 206 may not be present if the element ID field 202 can identify the type alone. The length field 204 indicates the length of the enhanced privacy element 200. In certain embodiments, the element ID field 202, the length field 204, the element ID extension field 206, the group count field 302, and the group ID field 304 are all one octet in length, the group epoch field 208 is between zero and twelve octets in length, and the number of participating STAs field 306 is three octets in length, and the length field 204 indicates the total number of octets.

The group count field 302 can indicate the number of available groups. The group ID field 304 can indicate the group the available groups advertisement element 300 is providing details about. The group epoch field 208 can include details of the group the available groups advertisement element 300 is providing details about. The number of participating STAs field 306 can include a participating STA count field 310 and a participating STA percentage field 312. The participating STA count field 310 can indicate the number of STAs 102 participating in the group the available groups advertisement element 300 is providing details about. The participating STA percentage field 312 can indicate the percentage of the total number of STAs participating in the group the available groups advertisement element 300 is providing details about.

Figure 4:
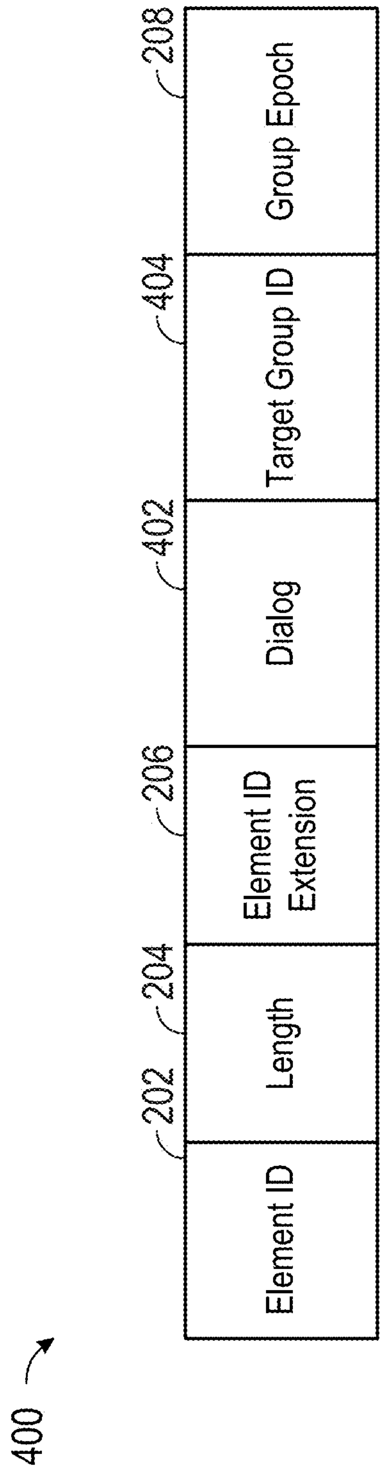
FIG. 4 is a block diagram of an individual STA epoch setting element in accordance with aspects of the present disclosure.

FIG. 4 is a block diagram of an individual STA epoch setting element 400 in accordance with aspects of the present disclosure. An STA 102 can send the individual STA epoch setting element 400 to the AP 110 to request to join a group or request individual epoch periods for MAC address rotation. The AP 110 can also use the individual STA epoch setting element 400 to respond to requests from STAs 102. The individual STA epoch setting element 400 may be an IE that is part of frames STAS 102 can send.

The individual STA epoch setting element 400 includes the element ID field 202, the length field 204, the element ID extension field 206, a dialog field 402, a target group ID field 404, and the group epoch field 208. The element ID field 202 identifies the type of the individual STA epoch setting element 400. The element ID extension field 206 may be used with the element ID field 202 to identify the type of the individual STA epoch setting element 400, but the element ID extension field 206 may not be present if the element ID field 202 can identify the type alone. The length field 204 indicates the length of the enhanced privacy element 200. In certain embodiments, the element ID field 202, the length field 204, the element ID extension field 206, the dialog field 402, and the target group ID field 404 are all one octet in length and the group epoch field 208 is between zero and twelve octets in length, and the length field 204 indicates the total number of octets.

The dialog field 402 can indicate the status of the frame carrying the individual STA epoch setting element 400. A value of zero may be reserved. In some embodiments, the dialog field 402 is set to one when the individual STA epoch setting element 400 is carrying a request from a STA 102 to the AP 110 to join a group or be assigned individual epoch periods. The dialog field 402 can be set to two when the AP 110 is accepting a request from a STA 102, such as assigning the STA 102 to a group or assigning individual epoch periods. The group epoch field 208 may not be present when the dialog field 402 is set to two. The dialog field 402 can be set to three when the individual STA epoch setting element 400 when the AP 110 is rejecting a request from a STA 102.

The dialog field 402 can be set to four when a STA 102 requests to not participate in any group. The group epoch field 208 may not be present when the dialog field 402 is set to four. The AP 110 may determine a STA 102 is requesting to use individual epoch periods when the dialog field 402 is set to four.

The dialog field 402 can be set to five when a STA 102 requests to not participate in a current group the STA 102 is assigned. The group epoch field 208 may not be present when the dialog field 402 is set to five. The AP 110 may send an available groups advertisement element 300 to the STA 102 for the STA 102 to evaluate other available groups to join or to request individual epoch periods.

The target group ID field 404 can indicate the target group an STA 102 is requesting to join. The STA 102 can also assign the target group ID field 404 a value to indicate that the STA 102 is requesting individual epoch periods. When the STA 102 is requesting individual epoch periods, the STA 102 can use the group epoch field 208 to indicate preferred epoch parameters.

Figure 5:
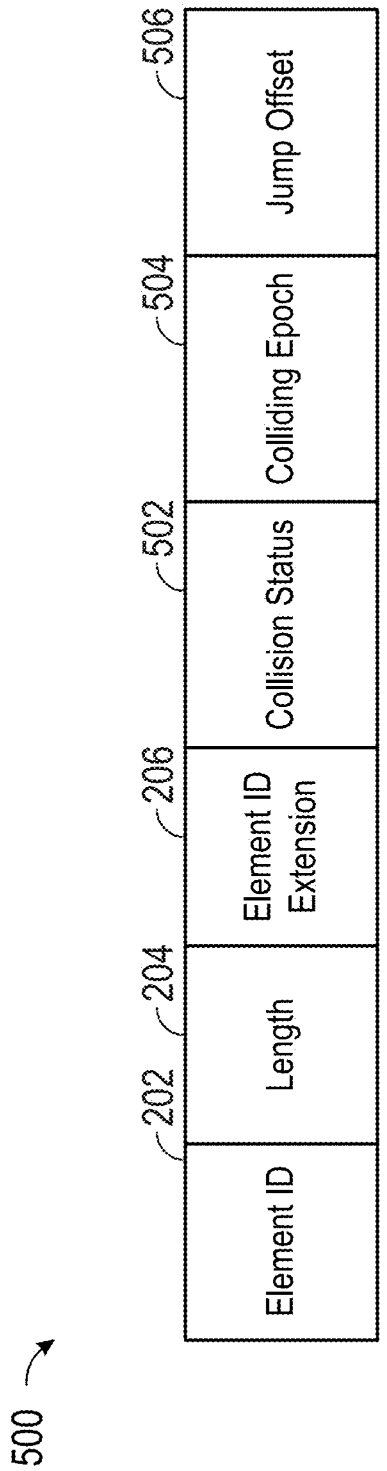
FIG. 5 is a block diagram of an collision warning action frame in accordance with aspects of the present disclosure.

FIG. 5 is a block diagram of an collision warning action frame 500 in accordance with aspects of the present disclosure. The AP 110 can send the collision warning action frame 500 to an STA 102 when the STA 102 may collide with another STA 102 during a future epoch. For example, the AP 110 sends the collision warning action frame 500 when the AP 110 determines two STAs 102 MAC addresses, AIDs, and/or the like may result in a collision for future epochs that will occur simultaneously. The collision warning action frame 500 may be an IE that is part of frames the AP 110 sends.

The collision warning action frame 500 includes the element ID field 202, the length field 204, the element ID extension field 206, a collision status field 502, a colliding epoch field 504, and a jump offset field 506. The element ID field 202 identifies the type of the collision warning action frame 500. The element ID extension field 206 may be used with the element ID field 202 to identify the type of the collision warning action frame 500, but the element ID extension field 206 may not be present if the element ID field 202 can identify the type alone. The length field 204 indicates the length of the enhanced privacy element 200. In certain embodiments, the element ID field 202, the length field 204, the element ID extension field 206, the collision status field 502, the colliding epoch field 504, and the jump offset field 506 are all one octet in length, and the length field 204 indicates the length of the collision warning action frame 500 is six octets.

The collision status field 502 can indicate the future epoch (e.g., the future associated MAC address, AID, etc.) that may result in a collision. The colliding epoch field 504 can indicate the AID or some other anonymization number of the STA 102 that the receiving STA 102 may collide with. The jump offset field 506 can indicate the number of epochs that the receiving STA 102 should skip in its calculation of its parameters for the target epoch. Thus, when the future epoch will occur when the next epoch period is triggered, the receiving STA 102 is expected to skip the parameters the future epoch associated with the collision and use the parameters of the future epoch indicated by the jump offset. For example, if the jump offset field 506 has a value of two and the future epoch associated is epoch 566, the subsequent epoch is 567, and the next subsequent epoch is 568, the STA 102 may jump to epoch 568 when the epoch 566 will occur next.

The STA 102 that receives a collision warning action frame 500 can respond to the AP 110 indicating that the STA 102 will jump to the indicated epoch to avoid the collision, indicating that the STA 102 will jump to a different epoch than the indicated epoch to avoid the collision, or will not jump to a different epoch. The response may include a reason for not following the collision warning action frame 500 when the STA 102 rejects the collision warning action frame 500. The AP 110 can then revise the collision recommendation and send a new collision warning action frame 500 to the same STA 102 or another STA 102.

Method

Figure 6:
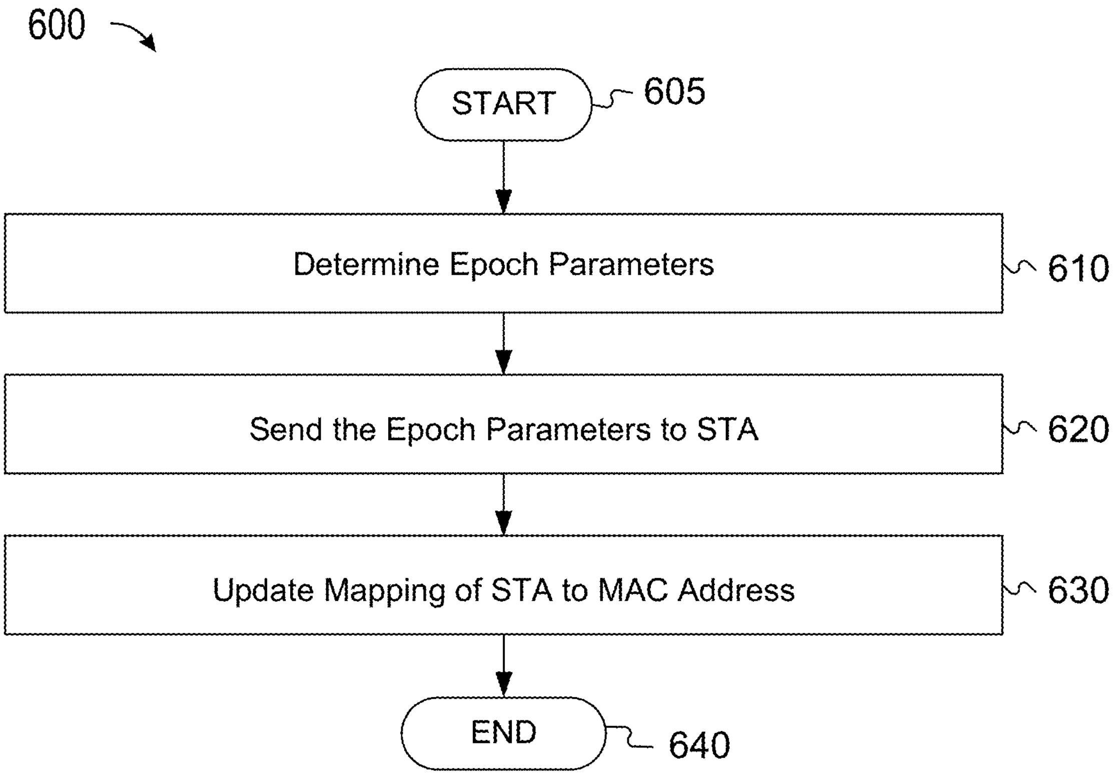
FIG. 6 is a flow chart of a method for an epoch scheme for STA privacy in accordance with aspects of the present disclosure.

FIG. 6 is a flow chart of a method 600 for an epoch scheme for STA privacy. The method 600 can begin at starting block 605 and proceed to operation 610. In operation 610, epoch parameters are determined for a STA. For example, the AP 110 determines epoch parameters for a STA 102. The epoch parameters can comprise a minimum epoch period duration and a maximum epoch period duration. The epoch parameters can also include a transmission timeout value indicating how long the previous MAC address can be validly used, a starting side value, and/or the like. In some embodiments, the AP 110 may advertise support for epoch periods for MAC address rotation as described above. In response, the AP 110 can receive a request from the STA to use epoch periods for MAC address rotation. Determining the epoch parameters may be in response to the request.

In operation 620, the epoch parameters are sent to the STA. For example, the AP 110 sends the epoch parameters to the STA 102. The STA 102 is operable to rotate its MAC address each epoch period at a time between the minimum epoch period duration and the maximum epoch period duration. The STA 102 can rotate its MAC address at any time between the minimum epoch period duration and the maximum epoch period duration for each epoch period. For example, the STA 102 can randomly determine a time between the minimum epoch period duration and the maximum epoch period duration to rotate the MAC address.

In operation 630, a mapping of the STA and the MAC address is updated each epoch period. For example, the AP 110 updates the MAC address of the STA 102 as it rotates its MAC address. Updating the mapping of the STA 102 and the MAC address for each epoch period can include the AP 110 receiving a frame from the STA with the new MAC address for the next epoch period and the AP 110 updating the mapping of the STA to the new MAC address, or the AP 110 sending a frame to the STA 102 with the new MAC address and updating the mapping of the STA 102 to the new MAC address.

In some embodiments, the AP can send a trigger signal as described above to cause the STA to rotate the MAC address. Thus, the AP 110 can control when STAs 102 start the next epoch period. In certain embodiments, the AP 110 and the STA 102 can perform a replica association process at a start of each epoch period. Thus, the STA 102 can appear to be a device newly associating to the AP 110 rather than just rotating its MAC address.

In some embodiments, the AP 110 can receive a frame from the STA 102 with a previous MAC address before a transmission timeout value. The AP 110 can validate or otherwise consider the frame valid in response to receiving the frame before the transmission timeout value. The AP 110 may find any frame received after the transmission timeout value as invalid. In some embodiments, the AP 110 can send frames to the STA 102 with a previous MAC address before the transmission timeout value. The AP 110 can remove any additional frames with the previous MAC address from its queue (e.g., stack) after the transmission timeout value.

The method 600 can further include the AP 110 determining a collision can occur between the STA and a second STA during a future epoch period of the STA. The AP 110 can then send a collision warning action frame 500 to the STA, the collision warning action frame 500 instructing the STA to skip the future epoch period and jump to a subsequent future epoch period. The method 600 can conclude at ending block 640.

Devices

Figure 7:
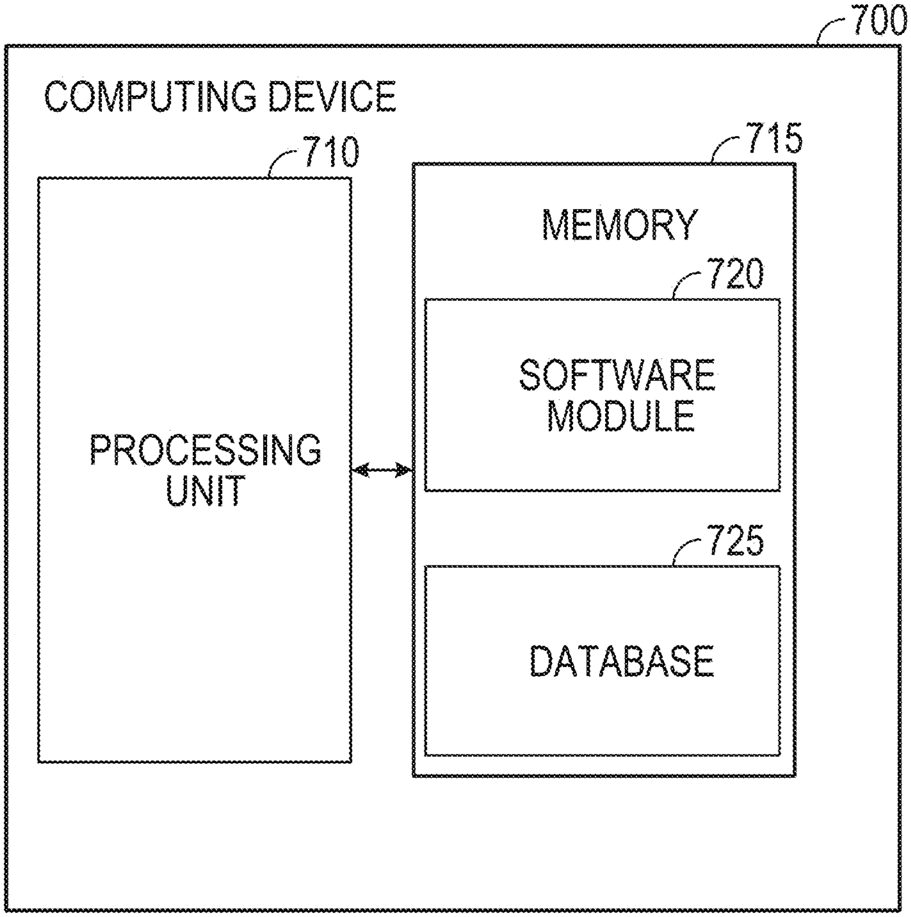
FIG. 7 is a block diagram of a computing device in accordance with aspects of the present disclosure.

FIG. 7 is a block diagram of a computing device 700. As shown in FIG. 7, computing device 700 may include a processing unit 710 and a memory unit 715. Memory unit 715 may include a software module 720 and a database 725. While executing on processing unit 710, software module

720 may perform, for example, processes for epoch schemes for STA privacy (e.g., MAC address rotation) with respect to FIG. 1, FIG. 2, FIG. 3, FIG. 4, FIG. 5, and FIG. 7. Computing device 700, for example, may provide an operating environment for the STAs 102, the AP 110, the controller 115, and the like. The STAs 102, the AP 110, the controller 115, and the like may operate in other environments and are not limited to computing device 700.

Computing device 700 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples, and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Figure 8:
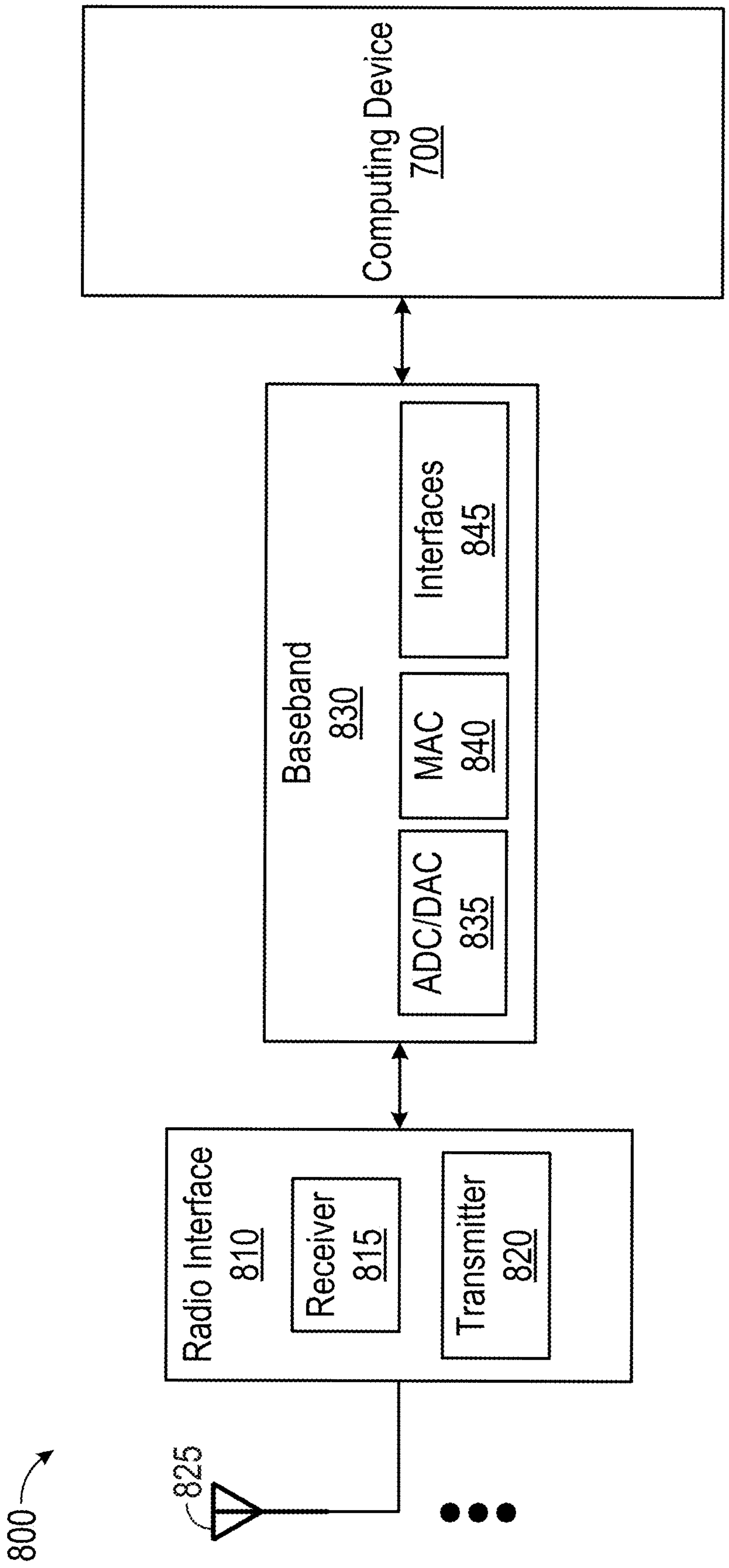
FIG. 8 is a block diagram of a computing device in accordance with aspects of the present disclosure.

FIG. 8 illustrates an implementation of a communications device 800 that may implement one or more of the STAs 102, the AP 110, the controller 115, etc., of FIGS. 1-6. In various implementations, the communications device 800 may comprise a logic circuit. The logic circuit may include physical circuits to perform operations described for one or more of the STAs 102, the AP 110, the controller 115, etc., of FIGS. 1-6, for example. As shown in FIG. 8, the communications device 800 may include one or more of, but is not limited to, a radio interface 810, baseband circuitry 830, and/or the computing device 700.

The communications device 800 may implement some or all of the structures and/or operations for the STAs 102, the AP 110, the controller 115, etc., of FIGS. 1-6, storage medium, and logic circuit in a single computing entity, such as entirely within a single device. Alternatively, the communications device 800 may distribute portions of the structure and/or operations using a distributed system architecture, such as a client station server architecture, a peer-to-peer architecture, a master-slave architecture, etc.

A radio interface 810, which may also include an Analog Front End (AFE), may include a component or combination of components adapted for transmitting and/or receiving single-carrier or multi-carrier modulated signals (e.g., including Complementary Code Keying (CCK), Orthogonal Frequency Division Multiplexing (OFDM), and/or Single-Carrier Frequency Division Multiple Access (SC-FDMA) symbols), although the configurations are not limited to any specific interface or modulation scheme. The radio interface 810 may include, for example, a receiver 815 and/or a transmitter 820. The radio interface 810 may include bias controls, a crystal oscillator, and/or one or more antennas 825. In additional or alternative configurations, the radio interface 810 may use oscillators and/or one or more filters, as desired.

The baseband circuitry 830 may communicate with the radio interface 810 to process, receive, and/or transmit signals and may include, for example, an Analog-To-Digital Converter (ADC) for down converting received signals with a Digital-To-Analog Converter (DAC) 835 for up converting signals for transmission. Further, the baseband circuitry 830 may include a baseband or PHYsical layer (PHY) processing circuit for the PHY link layer processing of respective receive/transmit signals. Baseband circuitry 830 may include, for example, a MAC processing circuit 840 for MAC/data link layer processing. Baseband circuitry 830 may include a memory controller for communicating with MAC processing circuit 840 and/or a computing device 700, for example, via one or more interfaces 845.

In some configurations, PHY processing circuit may include a frame construction and/or detection module, in combination with additional circuitry such as a buffer memory, to construct and/or deconstruct communication frames. Alternatively or in addition, MAC processing circuit 840 may share processing for certain of these functions or perform these processes independent of PHY processing circuit. In some configurations, MAC and PHY processing may be integrated into a single circuit.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:

determining epoch parameters for a Station (STA), the epoch parameters comprising a minimum epoch period duration and a maximum epoch period duration;

sending the epoch parameters to the STA, wherein the STA is configured to rotate a Media Access Control (MAC) address each epoch period at a time determined by the STA between the minimum epoch period duration and the maximum epoch period duration; and updating a mapping of the STA and the MAC address each epoch period.

2. The method of claim 1, further comprising:

advertising support for epoch periods for MAC address rotation; and receiving a request from the STA to use epoch periods for MAC address rotation, wherein determining the epoch parameters is in response to the request.

3. The method of claim 1, further comprising sending a trigger signal to cause the STA to rotate the MAC address.

4. The method of claim 1, further comprising:

receiving a frame from the STA with a previous MAC address before a transmission timeout value; and validating the frame in response to receiving the frame before the transmission timeout value, wherein the epoch parameters further comprises the transmission timeout value.

5. The method of claim 1, further comprising:

sending one or more frames to the STA with a previous MAC address before a transmission timeout value; and removing any additional frames with the previous MAC address from a queue after the transmission timeout value.

6. The method of claim 1, wherein updating the mapping of the STA and the MAC address for each epoch period comprises any one of (i) receiving a frame from the STA with a new MAC address and updating the mapping to the new MAC address, or (ii) sending a second frame to the STA with the new MAC address and updating the mapping to the new MAC address.

7. The method of claim 1, further comprising:

determining a collision can occur between the STA and a second STA during a future epoch period of the STA; and sending a collision warning action frame to the STA, the collision warning action frame instructing the STA to skip the future epoch period and jump to a subsequent future epoch period.

8. The method of claim 1, further comprising, at a start of each epoch period, performing a replica association process.

9. A system comprising:

a memory storage; and a processor coupled to the memory storage, wherein the processor is operative to:

determine epoch parameters for a Station (STA), the epoch parameters comprising a minimum epoch period duration and a maximum epoch period duration;

send the epoch parameters to the STA, wherein the STA is configured to rotate a Media Access Control (MAC) address each epoch period at a time determined by the STA between the minimum epoch period duration and the maximum epoch period duration; and update a mapping of the STA and the MAC address each epoch period.

10. The system of claim 9, the processor being further operative to:

advertise support for epoch periods for MAC address rotation; and receive a request from the STA to use epoch periods for MAC address rotation, wherein to determine the epoch parameters is in response to the request.

11. The system of claim 9, the processor being further operative to send a trigger signal to cause the STA to rotate the MAC address.

12. The system of claim 9, the processor being further operative to:

receive a frame from the STA with a previous MAC address before a transmission timeout value; and validate the frame in response to receiving the frame before the transmission timeout value, wherein the epoch parameters further comprises the transmission timeout value.

13. The system of claim 9, wherein updating the mapping of the STA and the MAC address for each epoch period comprises any one of (i) receiving a frame from the STA with a new MAC address and updating the mapping to the new MAC address, or (ii) sending a second frame to the STA with the new MAC address and updating the mapping to the new MAC address.

14. The system of claim 9, the processor being further operative to:

determine a collision can occur between the STA and a second STA during a future epoch period of the STA; and send a collision warning action frame to the STA, the collision warning action frame instructing the STA to skip the future epoch period and jump to a subsequent future epoch period.

15. A non-transitory computer-readable medium that stores a set of instructions which when executed perform a method executed by the set of instructions comprising:

determining epoch parameters for a Station (STA), the epoch parameters comprising a minimum epoch period duration and a maximum epoch period duration;

sending the epoch parameters to the STA, wherein the STA is configured to rotate a Media Access Control (MAC) address each epoch period at a time determined by the STA between the minimum epoch period duration and the maximum epoch period duration; and updating a mapping of the STA and the MAC address each epoch period.

16. The non-transitory computer-readable medium of claim 15, the method executed by the set of instructions further comprising:

advertising support for epoch periods for MAC address rotation; and receiving a request from the STA to use epoch periods for MAC address rotation, wherein determining the epoch parameters is in response to the request.

17. The non-transitory computer-readable medium of claim 15, the method executed by the set of instructions further comprising sending a trigger signal to cause the STA to rotate the MAC address.

18. The non-transitory computer-readable medium of claim 15, wherein updating the mapping of the STA and the MAC address for each epoch period comprises any one of (i) receiving a frame from the STA with a new MAC address and updating the mapping to the new MAC address, or (ii) sending a second frame to the STA with the new MAC address and updating the mapping to the new MAC address.

19. The non-transitory computer-readable medium of claim 15, the method executed by the set of instructions further comprising:

determining a collision can occur between the STA and a second STA during a future epoch period of the STA; and sending a collision warning action frame to the STA, the collision warning action frame instructing the STA to skip the future epoch period and jump to a subsequent future epoch period.

20. The non-transitory computer-readable medium of claim 15, the method executed by the set of instructions further comprising, at a start of each epoch period, performing a replica association process.

* * * * *